E. H. KEY.
Bee-Hive.
No. 223,924.  Patented Jan. 27, 1880.
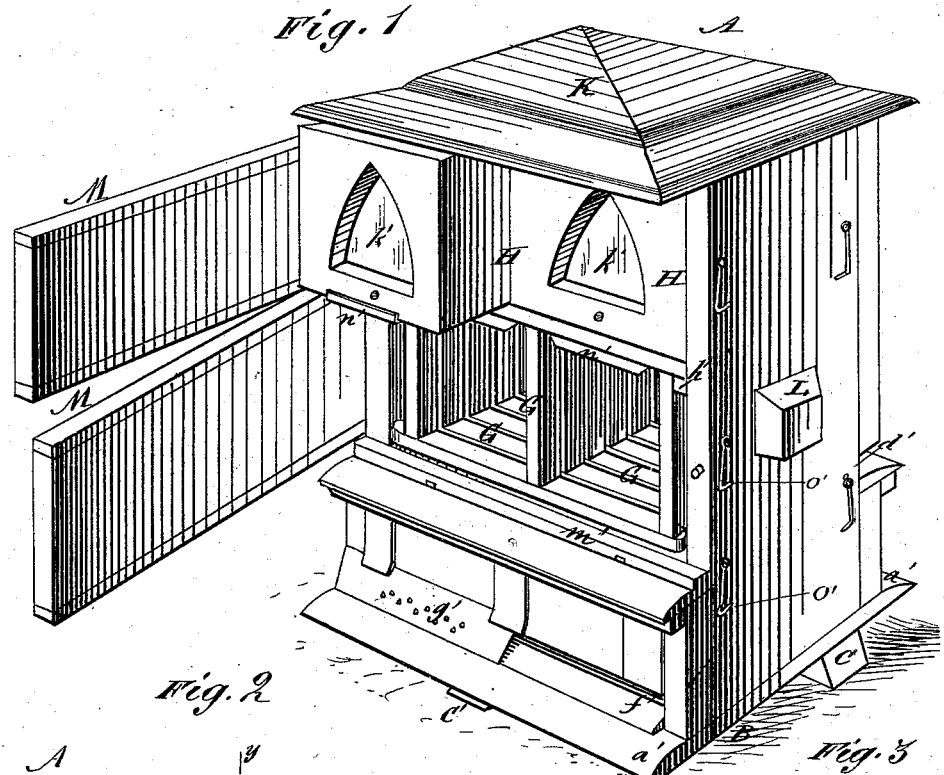
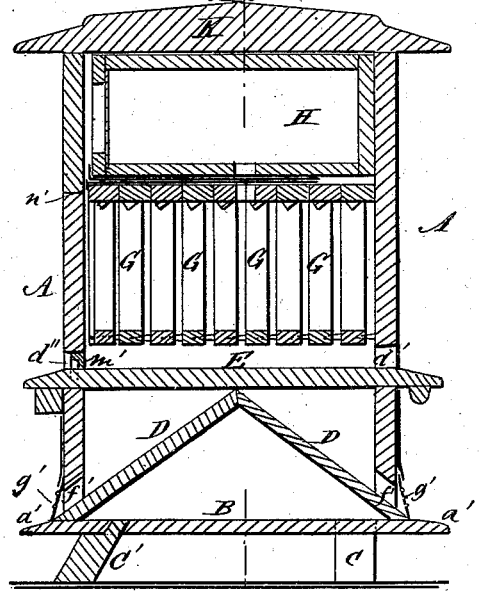
WITNESSES:
C. Neveux
C. Sedgwick
INVENTOR:
E. H. Key
BY Munn & Co.
ATTORNEYS.

UNITED STATES PATENT OFFICE.

ERASMUS H. KEY, OF MAYFIELD, KENTUCKY.

BEE-HIVE.

SPECIFICATION forming part of Letters Patent No. 223,924, dated January 27, 1880.

Application filed July 21, 1879.

*To all whom it may concern:*

Be it known that I, ERASMUS H. KEY, of Mayfield, in the county of Graves and State of Kentucky, have invented a new and Improved Bee-Hive, of which the following is a specification.

Figure 1 is an elevation of the hive, in perspective, with the front open. Fig. 2 is a sectional elevation on line $x\ x$, Fig. 3. Fig. 3 is a sectional elevation on line $y\ y$, Fig. 2. Fig. 4 represents a removable strip for closing the bee-entrance.

Similar letters of reference indicate corresponding parts.

The object of this invention is to construct a hive with better arrangements or provisions for the health and comfort of the bees and for the convenience of the bee-culturist than those ordinarily in use.

A represents a case, having the fixed bottom B, that extends so as to form sloping aprons $a'\ a'$ at the back and front of the case, and having on its under side three mortises for the reception of the removable legs C C'.

Within the hive is a fixed sloping bottom, D, composed of two inclined planes, resting upon the bottom B at its junction with the front and rear of the hive, and extending upward at an angle of about forty-five degrees to meet each other. Placed just above this is the removable or false bottom E, that is horizontally movable from front to back, and can at any time be entirely withdrawn, and this bottom is also so extended as to form inclined aprons back and front for the bees to alight upon, and the slots $d'\ d''$, through which it extends, serve as bee-entrances. The purposes of this sliding bottom are to hold the bees nearer to their work than can be done by an inclined bottom alone, and to prevent the bees from building comb below the sashes to the inclined bottom, and it keeps all below it clean and clear for the bees in the non-working season. At the commencement of winter, when the bees are in the hive, this sliding false bottom is to be removed, and the bee-entrances $d'\ d''$ closed by placing therein the closing-strips F, to exclude the cold, moths, &c., and so that the trash from the bees will fall on the inclined bottom, and thereby be led from the hive through the apertures $f'\ f'$. These apertures are ordinarily kept covered with perforated sheet-metal slides $g'\ g'$, through which or by means of which the hive may be ventilated, and when the bottom E is removed and the bee-entrances $d'\ d''$ closed these apertures $f'\ f'$ may serve as bee-entrances on the removal of the slides $g'\ g'$.

The sashes G G are ten, or thereabout, in number, and are suspended from strips $h'\ h'$, that are secured to the sides of the hive by the projecting ends of their upper rails. The projecting ends of their lower rails are beveled on the upper side to prevent the accumulation of trash upon them.

The honey-boxes H H are made of wood, and have a small glass, $k'$, let in at one end. Thus they are cheaper and stronger than full-ended glass boxes, and they (wooden boxes) are much preferred by the bees. The doors of the boxes are attached with hinges to sides thereof, and the bee-entrances are in the bottom, as they rest above the sashes.

The top K of the hive is pointed at the center, and sloping downward in each direction to shed rain, and it is made double, with the grain of the boards running across each other, in order to prevent warping or twisting out of shape.

When wishing to hive the bees the leg C' is removed, when the hive will assume an inclined position, and the bee-entrance $d''$ being closed by the removable strip $m'$, which may be temporarily pinned or buttoned on the false bottom E, the bees will instinctively approach the opposite entrance, so that they may be conveniently transferred to another hive.

To the hive belong two strips of tin or other sheet metal, $n'$, each with an end bent at a right angle to the body of it. When it is desired to remove a honey-box, one strip is inserted between the box and the sashes with hook down, and the other is then inserted over it with hook up. Then the operator places a thumb against the lower hook, to hold it in place, while with the other hand he holds the other strip against the box as he draws it out, thereby avoiding all moving or disturbing of the bees or being disturbed by them.

L L are the handles of the hive. The doors

M M are hinged to the body of the hive, and may be secured when closed by the hooks $o'$ $o'$ or other convenient devices.

Having thus described my invention, I claim as new and desire to secure by Letters Patent—

The hive herein described, having slotted sides holding the removable projecting base-board E, double incline D, openings $d'$ $d''$ $f'$, and their covers, all arranged substantially as shown and described.

ERASMUS H. KEY.

Witnesses:
E. G. CURD,
P. F. PURGERSON.